United States Patent [19]

Glazier

[11] Patent Number: 5,086,560
[45] Date of Patent: Feb. 11, 1992

[54] METHOD OF ASSEMBLING PRESTRESSED FRICTIONLESS BEARINGS

[76] Inventor: Stephen C. Glazier, 211 E. 35th St., Ste. 8B, New York,, N.Y. 10016

[21] Appl. No.: 469,400

[22] Filed: Jan. 24, 1990

[51] Int. Cl.⁵ ............................................. B21D 53/00
[52] U.S. Cl. .................................. 29/898.061; 29/446; 29/447; 29/898.041; 29/898.062; 384/548
[58] Field of Search .......... 29/898.061. 898.062, 29/898.041, 447, 434, 446, 521, 505; 384/548

[56] References Cited

U.S. PATENT DOCUMENTS

| | | | |
|---|---|---|---|
| 2,080,400 | 5/1937 | Fredrickson | 29/898.061 |
| 2,633,627 | 5/1953 | Olmstead | 29/898.062 |
| 2,759,243 | 8/1956 | Smith | 29/898.062 |
| 2,885,767 | 5/1959 | Barish | 29/898.062 |
| 2,913,859 | 11/1959 | Koch | 29/898.061 |
| 3,054,164 | 9/1962 | Recknagel | 29/898.062 |
| 3,401,441 | 9/1968 | Sutowski | 29/898.062 |
| 3,405,435 | 10/1968 | Sutowski | 29/898.062 |
| 3,765,071 | 10/1973 | Bowen | 29/898.062 |
| 4,002,380 | 1/1977 | Bowen | 308/207 R |

FOREIGN PATENT DOCUMENTS 946559  6/1949  France .

*Primary Examiner*—Irene Cuda
*Attorney, Agent, or Firm*—Harrison & Egbert

[57] ABSTRACT

A pre-stressed radial thrust frictionless bearing device comprising an annular inner race with a certain outer radius, an annular outer race with a certain inner radius, and an array of bearings rolling between the inner and outer races. Each of the bearings has a circular cross section of a certain diameter prior to assembly. Each of the bearings is pre-stressed into an oval or elliptical cross section following assembly. The device is assembled by heating and/or cooling parts of the device to temporarily change their dimensions to permit assembly without pre-stressing, and then permitting all the parts to return to the same temperature and corresponding dimensions causing pre-stressing.

4 Claims, 1 Drawing Sheet

METHOD OF ASSEMBLING PRESTRESSED FRICTIONLESS BEARINGS

BACKGROUND OF THE INVENTION

This invention relates generally to frictionless bearings, and more particularly to frictionless bearings where the anti-friction elements are prestressed. Ball bearings and roller bearings are examples of frictionless bearings, wherein the antifriction elements are balls and rollers, respectively. A prestressed anti-friction element means an anti-friction element that is stressed and compressed by the confining dimensions of the inner and outer races of the bearing before the bearing carries any load. For example, in an assembled pre-stressed roller bearing, the rollers (which may be hollow) are squeezed between the inner and outer races so that the rollers are elastically deformed to have an oval cross-sectional shape. This invention also relates to a method of assembling the present prestressed frictionless bearing, including without limitation pre-stressed ball bearings and roller bearings.

The prior art teaches roller bearings and ball bearings. A roller bearing consists of an annular inner race, a larger annular outer race, and cylindrical rollers that fit in between the inner and outer race. These parts are made to certain minimum tolerances, or error factors. They also must be designed with a certain amount of play or space between them so that they will easily fit together and to facilitate lubrication. Consequently, the assembled roller bearings have a certain amount of play or looseness in them, that results from the cumulative effect of manufacturing tolerances, and designed play. As a result, a shaft supported by a roller bearing has a certain freedom of radial movement within the roller bearing. This freedom of movement is a problem in high performance equipment, including machine tools, and turbines and causes early bearing failure in addition to reducing the accuracy of the equipment using the bearing.

Ball bearings are generally similar to roller bearings, except that cylindrical roller bearings are used in the latter case instead of spherical ball bearings.

French Patent No. 946,559 issued to Steffanini, published on June 8, 1949, U.S. Pat. No. 3,765,071 issued to Bowen on Oct. 16, 1973, U.S. Pat. No. 3,930,693 issued to Bowen on Jan. 6, 1976, and U.S. Pat. No. 4,232,914 issued to Bowen on Nov. 11, 1980, teach pre-stressed roller bearings and pre-stressed ball bearings. In these bearings when assembled and used, the inner races have a large enough diameter, and the outer races have a small enough diameter, so that when assembled the dimensions of the two races compress all the rollers. The rollers or balls do not fit between the races unless they are compressed into oval cross-sections. This prior art teaches a preferred embodiment of a roller bearing in which the rollers are hollow tubes.

The advantage of the prestressed roller on ball bearings is that a shaft supported by such a bearing is held with little or no freedom of radial movement even though the individual parts of the bearing are machined to conventional tolerances. This is because the rollers or balls are compressed in every direction around the inner race and the resulting compression and back pressure of the elastic rollers or balls act in an array around the inner race, in a flexible suspension system, together holding the inner race radially in place, although leaving the inner race free to spin. This system allows the flexible rollers to absorb deviations out of round of the rotating race, without an equivalent deviation of the support shaft. The resulting reduced radial play of the supported shaft can greatly extend the life of the bearing in high performance applications and increase the accuracy of the equipment using the bearing. Furthermore, these high precision results may be obtained with bearing parts made with parts that are made with conventional precision tolerances, and which therefore cost less while performing better than high precision parts in unstressed bearings.

These pre-stressed roller bearings promise to be a great advance for radial load bearings to supporting rotating shafts. Bearings of this type, specifically pre-stressed hollow roller bearings, have been made experimentally and tested with good results. These pre-stressed roller bearings, however, have not entered common use because they share a common problem. The common problem is that until the present invention, no design and method has been invented to assemble prestressed frictionless radial load bearings without damaging them.

The prior art's method has been to design and manufacture the bearing parts so that when assembled, the hollow roller bearing would be prestressed. Then the hollow roller bearings would be assembled into the outer race without the inner race, a process that does not require pre-stressing. At this point the inner race would be pressed and screwed into the assembly, thus compressing the hollow roller bearings. Of course, this axial movement of the inner race across the faces of the roller bearings under compressing pressure caused scoring of the bearing surfaces. This process was a difficult, special art, requiring special hydraulic presses, and even the best craftsman could not reliably produce an assembled prestressed roller bearing of known undamaged condition.

The problem of satisfactorily assembling prestressed roller or ball bearings, with ordinary skill and tools, without damaging the parts, is a problem of long standing without an answer until the present invention. At least since 1947, when Steffanini was granted the patent cited above, this has been an unsolved problem. Failure to solve this problem despite the best efforts of the bearing industry for at least 40 years, has been the primary reason that pre-stressed roller and ball bearings have not been commercialized and brought into general use. The present invention solves this problem for the first time and yields the new result that prestressed roller and ball bearings can now be in general use and be made into an economic success.

The process of heating selected parts to temporarily expand them, and thereby facilitate their permanent joining together with other parts, is well known and is sometimes called "sweating". As a process it is an alternative to welding, or to designing a part as a single part instead of two parts. For example, the barrels and bodies of guns are often made separately and then sweated together. That is, the gun body, with an annular female flange to receive the barrel, is heated and expands. The cold barrel, with a simple male end, is then inserted into the body of the gun. The gun body then cools and shrinks, gripping the barrel and fixing the barrel into the body. Practically speaking, the barrel and body are then permanently joined as one piece, without any possibility of movement of the barrel within the body. Sweating has always been used only to join two pieces into one piece without subsequent movement between the joined pieces. Sweating has never been used with bearings or prestressed bearings to stress them.

U.S. Pat. No. 2,449,944 issued to Johnson on Sept. 21, 1948, and U.S. Pat. No. 2,792,619 issued to Komm on May 21, 1957 both teach heating and then unheating selected parts of roller bearings merely to facilitate assembly. The Johnson patent teaches the sweating of a retainer ring onto a race, as a method of permanently attaching the ring to the race. The Komm patent teaches heating to expand a retainer lip or flange on an outer race, to permit its assembly over the inner race and rollers, and then cooling the retainer lip or flange to shrink it to retain in an assembled manner the entire device. But these patents deal only with conventional un-prestressed roller bearings, and the changes in temperature and dimension are not used to pre-stress the rollers, as is the case in the present invention.

It is well known that many materials, and most metals, expand when heated, and contract when cooled. However, this knowledge has never been used to design or assemble prestressed bearings, or to design and assemble parts of any kind that move in relation to each other after assembly.

A problem with assembled prestressed roller bearings in the past has been that the pressure between the rollers and their races has squeezed out the lubricants and protective coatings. Hence, when stored, oxidation has sometimes occurred at these pressured points of contact. Once the bearing is put into use, this contact oxidation has not been a problem because the motion of the bearing has uniformly distributed the anti-oxidant lubricant.

SUMMARY OF THE INVENTION

The present invention is a prestressed roller or ball bearing, manufactured to conventional tolerances for machined metal parts such that when the parts are assembled, and all the parts are at the same desired operating temperature, then all the rollers or balls are pre-stressed by the dimensions of the inner and outer races. Furthermore, the materials and dimensions of the present invention are selected such that the material of the outer race expands when heated, and contracts back to its original dimensions when cooled to its original temperature, such that assembly is facilitated and the anti-friction elements are pre-stressed. This device is assembled by the instant process. The rollers or balls are assembled on the inner race, which does not require prestressing. The outer race is then heated until it expands to provide enough clearance with the assembled rollers or balls to permit assembly of the outer race with the rollers or balls without pre-stressing or contact with the rollers or balls. Then the outer race is allowed to cool, shrinking back to its original temperature and dimensions. This contraction results in pre-stressing the rollers or balls, without any lateral movement of the races over the roller or balls under compression. No scoring or damage results. The process is simple, consistent and relatively unskilled.

A variant of the present invention provides for making the inner race of a material that contracts when cooled, and then expands to its original dimensions when it returns to its original temperature. The inner race is then assembled and cooled until it contracts enough to permit a clearance with the rollers assembled in the outer race. The outer race and rollers are then assembled with the inner race, a process not requiring pre-stressing of the rollers. The inner race is then warmed to their original temperature, expanding to pre-stress the rollers.

Another variant of the present invention uses the outer race of the first example above, and the inner race of the second example. The outer race is heated and expands. The inner race is cooled and contracts. The parts are assembled and return to their original temperature and dimensions. In doing so, the rollers are compressed.

The present device and method permits non-destructive assembly of the frictionless bearing parts, and then development and application of the tremendous pressure needed to pre-stress the rollers and balls. The change of dimension caused by the change of temperatures develop such pressures without equipment or movement.

Once the present invention is assembled and returned to normal temperature, it is submerged in oil, silicon, or other antioxidant lubricant. It is stored and shipped in this manner until installed and used.

The objects of the present invention are to provide designs and methods of assembly of prestressed roller and ball bearings that can be reliably and consistently assembled without great skill or exotic expensive tools, in the factory prior to installation, resulting in an assembled, ready to use, prestressed roller or ball bearing that can then be installed by the same means, with the same skill and tools, on the same shafts, as a conventional unprestressed roller o ball bearing.

DESCRIPTION OF PREFERRED EMBODIMENTS

Figure 1:
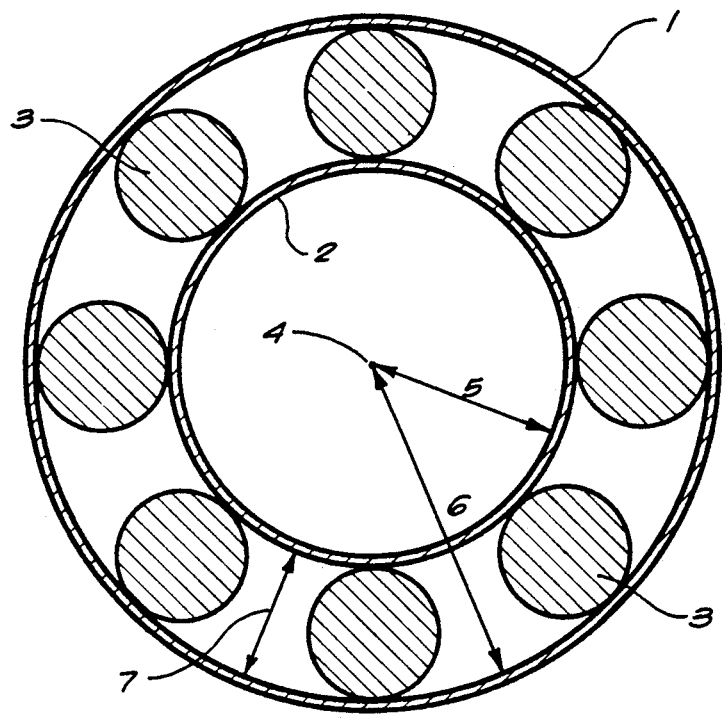
FIG. 1, shows a cross-sectional view of an assembled roller bearing.

FIG. 1 shows an assembled roller bearing or ball bearing in cross-sectional view, comprising an outer race 1 to contain the outer edge of the array of rollers 3 or balls 3, and the inner race 2 to contain the inner edge of the said array of rollers or balls between said inner and outer races. FIG. 1 also shows the center 4 of the assembled roller bearing, the outer radius 5 of the inner race 2, the inner radius 6 of the outer race 1, and the difference 7 between these two radii.

Figure 2:
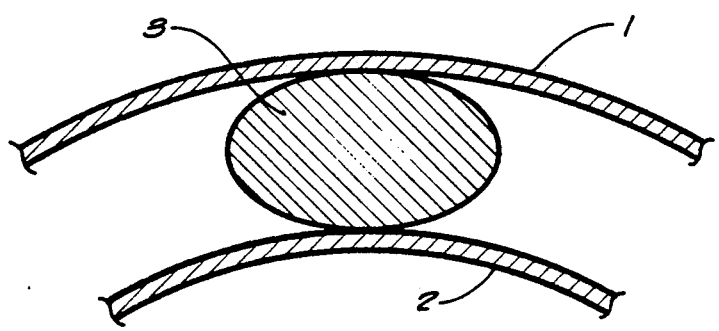
FIG. 2 shows a cross-sectional view of one section of a prestressed roller bearing showing the deformation caused in a roller by pre-stressing.

FIG. 2 shows a detail in cross-sectional view of the assembled prestressed roller or ball bearing, showing the outer race 1 and the inner race 2, and one of the roller 3 or ball 3, showing the roller or ball deformed from its circular cross-section into an oval or elliptical cross-section by the forces of pre-stressing in the bearing.

Tool steel conventionally has a coefficient of thermal expansion of $7 \times 10^{-6}$ inches/inch/degree Fahrenheit (that is, $7 \times 1/1,000,000$ I/I/F). That is, tool steel conventionally will expand $7 \times 10^{-6}$ inches, per each inch of length of the piece, per each degree Fahrenheit that the piece is heated. Conversely, the piece will contract by the same amount for each degree Fahrenheit it is cooled. Aluminum has a high thermal coefficient of expansion of $25 \times 10^{-6}$ I/I/degrees Centigrade. Titanium has a low thermal expansion coefficient of $6 \times 10^{-6}$ I/I/F. Many super-alloys have a thermal expansion coefficient of about $7.5 \times 10^{-6}$ I/I/F.

Conventional machining is done to a tolerance of $10^{-4}$ inch and superfinishing techniques are commonly done to a tolerance of $10^{-6}$ inch. A tolerance of $10^{-4}$ inch is usually satisfactory for conventional aerospace tolerances.

800 degrees Fahrenheit is a heat limit for many tool metals, since at higher temperatures these metals may change their engineering characteristics. Heating to only 600° F. for most alloys does not change their engineering characteristics. However, heating to this temperature can encourage and accelerate oxidation while the heat is maintained. This can alter and damage the finish on the part where a particular finish is required. Therefore, heating to this temperature is often done in an inert atmosphere, or in a near vacuum, or in a reducing atmosphere. A reducing atmosphere is an atmosphere that reacts to and neutralizes oxygen, thus deterring oxidation.

When temperature changes are needed to temporarily change dimensions of metal, cooling in liquid nitrogen is sometimes used rather than heating, since the same percentage change in the original dimension can be obtained, although in the decreasing mode rather than the increasing mode, and the lack of heat eliminates any threat to the finish from oxidation.

It is well known that large mechanical forces can be generated by the expansion and contraction caused in a metal part by a change in the part's temperature.

For certain special applications only, the use of temporary thermal expansion or contraction is a previously known method of assembly. This method of assembly is also known as thermal interference fit and thermal shrink fit.

The preferred embodiment of the present process depends on the required size and material of the particular bearing application in question. As an example of a preferred embodiment, a titanium bearing can be examined with a one inch diameter outer race.

Titanium has a coefficient of thermal expansion of about $6 \times 10^{-6}$ I/I/F, that is, 0.000006 I/I/F. Heated by 500° F., this would yield an expansion of 0.0003 inches per inch. Therefore, a 1 inch diameter inner race for a roller bearing, which is a very small roller bearing, would expand 3/1,000 inches if heated by 500° F., this is an expansion of 3 mils. The race would be conventionally machined to an accuracy between 1/10,000 and 1/1,000,000 inch. Hence, if the bearing were manufactured so that the inner race were 1.5 mils plus or minus a mil, "too big," and then the race were cooled by 500° F. for assembly, the inner race would contract 3 mils and would have a loose fit. Then when the bearing was assembled and the inner race was re-heated to room temperature, the inner race would expand back by 3 mils in diameter to pre-stress the rollers.

In a 4 inch diameter bearing race of the same material, the diameter would change by 12 mils or 1.2% of an inch.

From these calculations it is clear that the dimensional change available from heating and cooling regarding the present invention is quite adequate to provide the necessary dimensional changes for unstressed assembly by thermal interference fit of a bearing that automatically pre-stresses when the assembled parts return to room temperature.

The embodiments as illustrated and discussed in this specification are intended only to teach those skilled in the art the best way known by the inventor to make and use this invention. Nothing in the specification should be considered as limiting the scope of the present invention. Many changes could be made by those skilled in the present invention. Many changes could be made by those skilled in the art to produce equivalent systems without departing from the invention. The present invention should be limited only by the following claims and their legal equivalents.

For example, different materials could be used for the bearings, such as steel, chromium alloys, or ceramics. And for example, different sizes of bearings could be made, such as those of inner race diameter of 2 inches, 4 inches or other dimension, or metric dimension could be used. And for example, different temperature changes could be used in the assembly process.

I claim:

1. A method for assembling a pre-stressed radial thrust frictionless bearing device, said device having an annular inner race, an annular outer race, and a plurality of bearings, said method comprising the steps of:

assembling all of said plurality of bearings around said inner race;

heating said outer race so as to expand said outer race;

assembling the expanded outer race over the assembled inner race without pre-stressing the plurality of bearings around said inner race; and contracting said outer race to its original size by cooling said outer race to its original temperature so as to pre-stress said plurality of bearings.

2. A method of assembling a pre-stressed radial thrust frictionless bearing device, said device having an annular inner race, an annular outer race, and a plurality of bearings, said method comprising the steps of:

cooling said inner race so as to contract said inner race;

assembling all of said plurality of bearings into said outer race;

placing said contracted inner race into the assembled outer race without pre-stressing the plurality of bearings inside said outer race; and heating said inner race to its original temperature so as to expand said inner race to its original size and to pre-stress said plurality of bearings.

3. A method of assembling a pre-stressed radial thrust frictionless bearing device, said device having an annular inner race, an annular outer race, and a plurality of bearings, said method comprising the steps of:

cooling said inner race so as to contract said inner race;

heating said outer race so as to expand said outer race;

assembling the heated outer race, the cooled inner race, and all of said plurality of bearings;

pre-stressing said plurality of bearings within said outer race and said inner race.

4 The method of claim 3, said step of pre-stressing comprising:

heating the cooled inner race to its original temperature so as to expand said inner race to its original size; and cooling the heated outer race to its original temperature so as to contract said outer race to its original size.

* * * * *